Sept. 7, 1943.   C. L. QUEAR   2,328,672
FLY ROD REEL
Filed Nov. 17, 1941
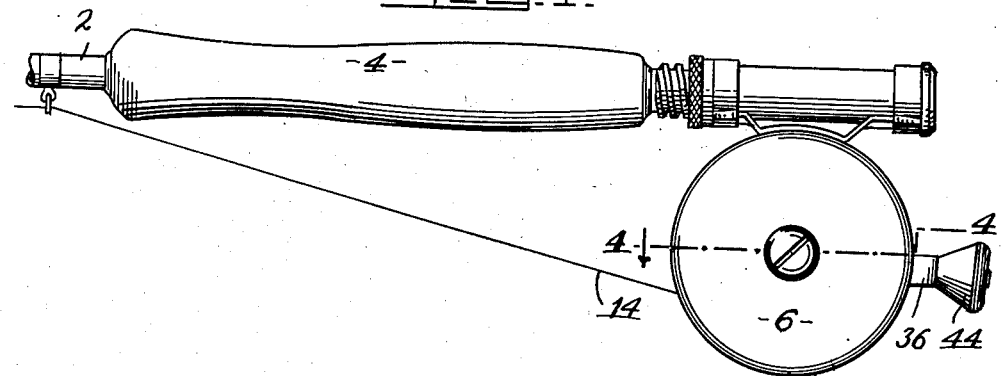
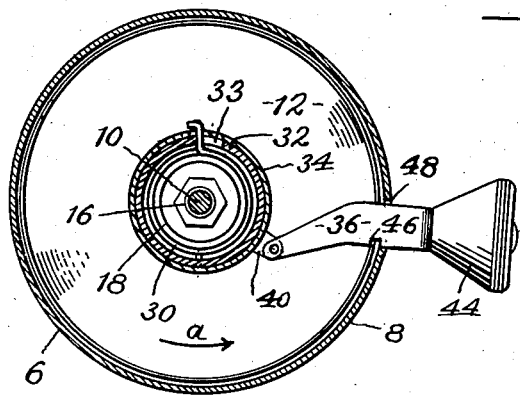
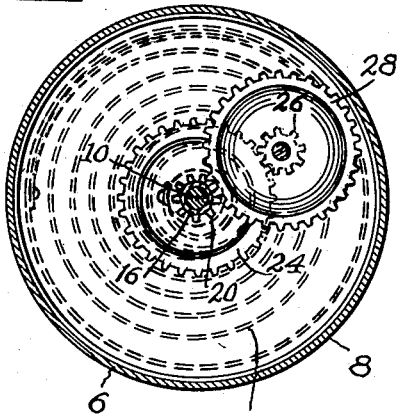
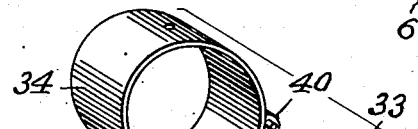
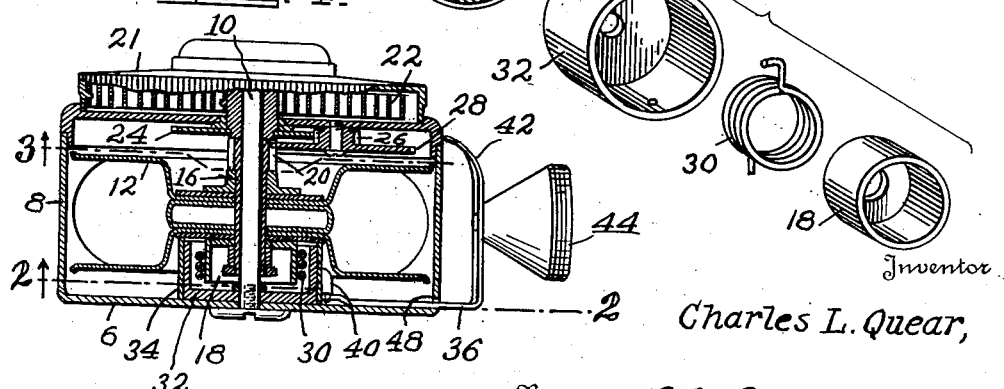
Inventor
Charles L. Quear,
By F. G. Fischer,
Attorney Patented Sept. 7, 1943

2,328,672

UNITED STATES PATENT OFFICE 2,328,672

FLY ROD REEL

Charles L. Quear, Kansas City, Mo.

Application November 17, 1941, Serial No. 419,475

2 Claims. (Cl. 242—84.3)

The latest reels now employed on fly rods usually include a spool, a coil spring for rotating the spool to wind a fishing line thereon, a friction brake for checking rotation of the spool, and manual means for releasing the brake. The reel is usually attached to the handle of the fly rod so that the manual brake releasing means will be within convenient reach of the hand grasping the handle, so that slack in the line can be quickly taken up when a fish takes the bait.

One important objection to the foregoing arrangement is that during the excitement of landing a game fish it frequently happens that the hand will slip forward on the rod far enough to get out of reach of the brake releasing means, so that some delay may ensue and use of the other hand which may be holding a dip net, may be required before slack in the line can be taken up.

The principal object of the present invention is the provision of brake releasing means which is not dependent upon the position of the hand on the rod for its operation but may be quickly actuated by the angler pressing the brake releasing means against his body, or some other object.

Other objects will hereinafter appear and in order that the invention may be fully understood, reference will now be had to the accompanying drawing in which:

Fig. 1 is a broken side elevation of a fly rod provided with a reel equipped with my brake releasing means.

Fig. 2 is a sectional view of the reel on line 2—2 of Fig. 4.

Fig. 3 is a sectional view of the reel on line 3—3 of Fig. 4.

Fig 4 is a horizontal sectional view on line 4—4 of Fig. 1, with the fishing line omitted.

Fig. 5 shows the brake shoe mechanism disassembled and part of my brake releasing means.

Referring in detail to the different parts, 2 designates a fly rod equipped with a handle 4 and a reel 6, which latter is secured to the rear end of the fly rod as shown by Fig. 1. The reel 6 in the present instance is of conventional form, with the exception of my brake releasing means and comprises a cylindrical casing 8 having a central stationary shaft 10 upon which a spool 12 is freely mounted so that the fishing line 14 may be wound upon or unwound from said spool.

The spool 12 has a tubular axial shaft 16 fixed therein which is freely mounted upon the stationary shaft 10 and provided at one end with a fixed brake drum 18 and at its opposite end with an integral pinion 20. The pinion 20 is arranged to be driven in the direction of the arrow a, Fig. 2, by a coil spring 22 through the medium of gear wheels 24, 26 and 28, which latter intermeshes with the pinion 20. The coil spring 22 is connected at its inner end to the hub of gear wheel 24 and connected at its outer end to a housing 21 at one end of the reel casing 8.

The brake drum 18 is embraced by a brake shoe 30 consisting of a contractile spiral spring so arranged that the tendency of the coil spring 22 to rotate the spool 12 in the direction of the arrow a causes the spring 30 to wind upon the brake drum 18 and thereby grip the same with sufficient friction to prevent backward rotation of the spool, although it is free to rotate in the opposite direction when paying out the line 14.

One end of the spiral spring 30 is fixed to a stationary cup-shaped member 32 while its opposite end extends freely through a slot 33 in the member 32 and is connected to a sleeve 34 rockably mounted upon the member 32 and constituting one element of the present invention. Another element of the present invention comprises an arm 36 which extends into the reel and is pivotally connected at its inner end to an ear 40 fixed to the sleeve 34.

The outer part of arm 36 is bent transversely and terminates in a forwardly curved end 42 which bears against the rear portion of the reel as shown by Fig. 4. When the arm 36 is pushed inward to actuate the sleeve 34 the curved end 42 yields but exerts sufficient lateral pressure upon the arm to force it against the adjacent wall of the reel whereby the arm is sustained and prevented from buckling under the pressure exerted thereon. The transverse extension of the arm 36 is provided with a fixed button or knob 44, whereby the arm may be manually pushed inward to operate the sleeve 34 and effect release of the brake drum 18, as will hereinafter more fully appear.

The foregoing arrangement will also prevent slack line from getting caught between the transverse part of the arm and the adjacent portion of the reel. The button 44 is also tapered to prevent the line 14 from cathing thereon.

With the parts arranged as shown and described it is apparent that when the angler is casting for a strike the spool 12 is free to turn in a reverse direction to the arrow a to pay out the line 14. In the event, however, that a fish takes the bait, slack in the line 14 may be quickly taken up by moving the hand that is grasping the rod backward until the button 14 is carried into contact with the body of the angler with sufficient pressure to push the arm 36 inward and thereby cause the sleeve 34 to partially unwind the spiral spring forming the brake shoe 30. Thus the brake drum 18 is released and permits the coil spring 22 to rotate the spool 12 in the direction of arrow $a$ and thereby take up slack in the line 14. During the foregoing operation the other hand is left free to either manipulate the line or a dip net to facilitate landing of the fish.

To prevent the arm 36 from accidentally releasing the brake shoe 30 while the rod 2 is being carried along the bank of a stream or other place, the arm is provided with a notched portion 46, Fig. 2, adapted, when the arm is manually pulled outward, to engage over the lower end of a slot 48 formed in the circumferential wall of the reel for passage of the arm 36. When the parts are in normal position as shown, the notch 46 is in front of the slot 48, so that it will not engage over the lower end of the latter when the arm 36 is pushed inward to release the brake drum 18, as above described.

From the above it will be readily understood that slack in the line 14 can be readily taken up regardless of where the fly rod is grasped by one hand so long as the button 44 can be pressed against the body or other object to effect release of the brake drum 18 from the brake shoe 30, and that the other hand will be free to manipulate the line, or a dip net when landing a fish.

From the foregoing description, taken in connection with the drawing, it is apparent that I have provided brake releasing means for reels which is well adapted for the purpose intended, and while I have shown the preferred form thereof I reserve all rights to such other forms and modifications as properly fall within the scope of the invention as claimed.

Having thus described my invention, what I claim and desire to secure by Letters Patent, is:

1. The combination with a reel provided with a spool, spring means for rotating said spool backward to wind a fishing line thereon, a brake drum fixed to the spool, a stationary cylindrical member arranged concentric with the drum and provided with a slot, and a brake shoe comprising a spiral spring embracing the drum and adapted to normally prevent backward rotation thereof, one end of said spring being fixed to the cylindrical member and the other end projecting freely through the slot, of a sleeve freely mounted upon the cylindrical member and connected to the projecting end of the spring, and means extending into the reel and connected to said sleeve to cause the same to release the brake drum from the spring when pressure is applied to the outer portion of said means.

2. The combination with a reel provided with a spool, spring means for rotating said spool backward to wind a fishing line thereon, a brake drum fixed to the spool, a stationary cylindrical member arranged concentric with the drum and provided with a slot, and a brake shoe comprising a spiral spring embracing the drum and adapted to normally prevent backward rotation thereof, one end of said spring being fixed to the cylindrical member and the other end projecting freely through the slot, of a sleeve freely mounted upon the cylindrical member and connected to the projecting end of the spring, an arm extending into the reel and connected to said sleeve, and a button fixed to the outer portion of the arm and adapted to cause the same to release the brake drum from the spring through the medium of the sleeve when said button is subjected to pressure.

CHARLES L. QUEAR.